Oct. 6, 1953     F. K. H. NALLINGER     2,654,265

STEERING GEAR

Filed Feb. 8, 1952

Friedrich K. H. Nallinger
By Dickey and Padlon
Attorneys

Patented Oct. 6, 1953

2,654,265

UNITED STATES PATENT OFFICE 2,654,265

STEERING GEAR

Friedrich K. H. Nallinger, Stuttgart, Germany, assignor to Daimler-Benz Aktiengesellschaft, Stuttgart-Unterturkheim, Germany Application February 8, 1952, Serial No. 270,555
In Germany February 10, 1951

8 Claims. (Cl. 74—499)

This invention relates to a steering gear having an axially displaceable member, and in particular to a steering nut axially displaceable on a steering worm wherein the movements of the steering nut are transmitted to a steering lever, the axis of rotation of which is arranged to cross the axis of the displaceable member or of the steering worm, and a spheroidal coupling element providing engagement between steering nut and steering lever.

One object of the invention is to provide a simplified design and easy exchangeability of the spheroidal coupling element so as to reduce the cost of manufacture of the steering gear.

A further object of the invention is to provide a compact assembly of the steering gear to occupy minimum space.

Another object of the invention is to provide a safe mounting of the spheroidal element in one of the two interengaging elements as well as a safe engagement of a partially spherical head and a partially spherical recess, the latter serving as a ball socket.

An essential feature of the invention accordingly resides in that the spheroidal coupling element is designed as a mushroom-shaped insertion member with its shaft inserted into the one element, preferably into the steering lever and with its partially spherical, e. g. approximately semispherical or similar-shaped head engaging in a corresponding recess, acting as a ball socket, of the other element, preferably the steering nut.

According to a further feature of the invention the recess referred to above and acting as a ball socket is provided with a cylindrical annular boss protruding beyond the ball center.

According to a further feature of the invention the spheroidal coupling element is held by spring action in engagement with the above mentioned ball socket shaped recess, such as by a spring acting in the direction of engagement on the steering gear lever shaft and on the steering lever associated therewith.

According to a further feature of the invention, the steering nut is mounted on the steering worm by means of one or a plurality of endless ball rows running in threads in order to reduce frictional resistance. The recess serving as a ball socket conveniently is arranged in a boss of the steering nut, the recess extending closely up to the running paths of the ball row or rows in the threaded assembly.

Figure 1:
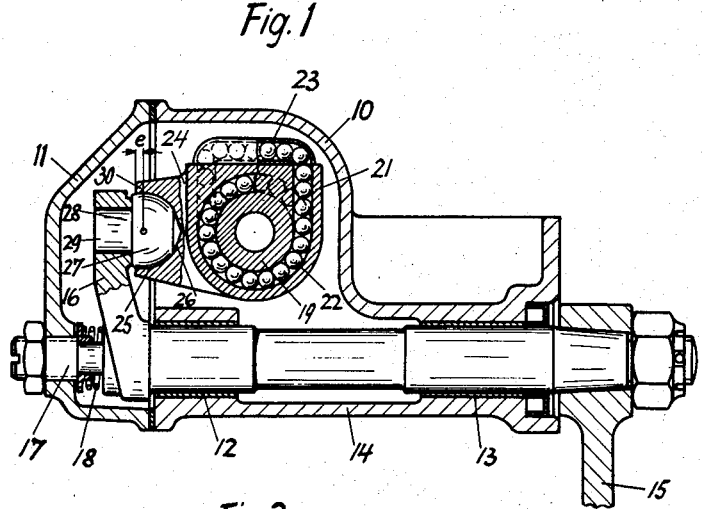
Figure 2:
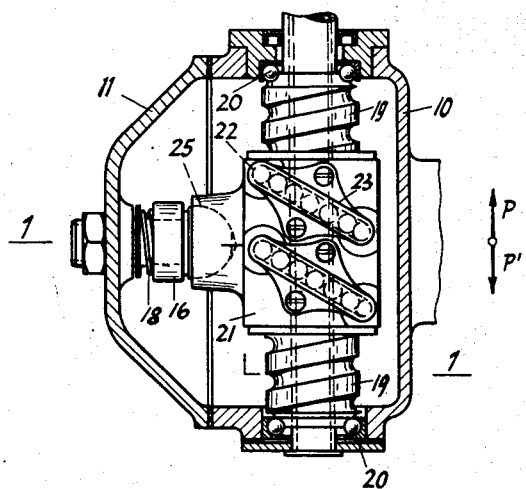

One embodiment of the invention is illustrated by way of example in the accompanying drawings, in which:

Fig. 1 is a sectional view of the steering gear embodying the invention taken on line I—I of Fig. 2, and Fig. 2 is a plan view of the same.

In the drawings, the steering gear is shown as applied to a motor vehicle and is accommodated in a steering gear housing 10 having a cover 11. Two bushings 12 and 13 are mounted in the housing 10 and support a steering gear lever shaft 14 carrying an outer steering gear arm 15 leading to the road wheels and an inner steering lever 16. A spring 18, the tension of which is adjustable by means of an adjuster screw 17, urges the steering gear lever shaft to the right as seen in Fig. 1. A steering worm 19, being axially and radially supported against the housing by means of thrust ball bearings 20, has mounted thereon a steering nut 21. Engagement between worm and nut is provided in a manner known as such by two continuous rows of balls 22 running in the thread of the steering worm 19 on one hand and of the steering nut 21 on the other and within some (e. g. one and a half) threads of each of the mating parts, the balls being returned in a manner known as such from the ends of these threads to the beginning of the particular threads provided for them through tubular ball guides 23 attached to the steering nut.

The steering nut 21 has a boss 24 formed internally with a recess 25 serving as a ball socket which is tapered on its bottom 26 in order to simplify manufacture. The ball socket 25 serves to receive the approximately hemispherical or similar-shaped head 27 of a mushroom-shaped insertion member, the shaft 29 of which is inserted into a bore of the steering lever 16. The boss 24 is formed with a cylindrical extension 30 axially protruding beyond the center of the ball head 27 by an amount $e$.

The spring 18 acts by means of the steering lever 16 to hold the mushroom-shaped insertion member 28 with its head 27 in positive engagement with the recess 25 serving as a ball socket, the cylindrical extension 30 of the boss 24 constituting an additional safety means against unintentional disengagement of ball head 27 and ball socket on assembling or due to shocks. Upon actuation of the steering worm the nut is axially displaced in the direction of the arrows $p$ and $p'$ respectively, the ball rows 22 permitting a practically frictionless sliding motion of the nut on the worm 19. The center of the ball head 27 thus being pivoted about the axis of the shaft 14, a corresponding rotational movement about the axis of the worm 19 is imparted to the nut 21.

It will be understood that various modifications of the present steering gear may be used and that the foregoing is illustrative only.

What I claim is:

1. A steering gear, comprising a member capable of being displaced in one direction, a lever arm whose axis of rotation crosses the direction of axis of said displaceable member, means for coupling said lever arm with said displaceable member including a mushroom-shaped insertion member and consisting of a shaft and of a substantially hemispherical, partially ball-shaped head, a bore in one of the elements to be coupled adapted to receive the shaft of said insertion member, and partially ball-shaped recess in the other of the elements to be coupled for the reception of the partially ball-shaped head of said insertion member, and compression means for normally maintaining said head in connection with said recess.

2. A steering gear, comprising a steering worm, a steering nut encompassing said steering worm, and means adapted to provide engagement between worm and nut such that, upon rotation of said worm, said nut is axially displaced in relation to said worm, a lever arm of which the axis of rotation is crossing the axis of said worm, and elastic means adapted to provide engagement of lever arm and nut including a mushroom-shaped insertion member consisting of a shaft of relatively small diameter and a partially ball-shaped head of relatively large diameter and limited by a shoulder immediately toward said shaft, a bore in the one of the elements to be coupled adapted to receive the shaft of the insertion member in such a manner that the shoulder is adapted to axially abut against said element, and a partially ball-shaped recess in the other of the elements to be coupled for the reception of the partially ball-shaped head of the insertion member, the axis of said mushroom-shaped insertion member is substantially in parallel relationship with the axis of rotation of said lever arm, and further comprising elastic means on said lever arm adapted to hold said mushroom-shaped insertion member in engagement with said partially ball-shaped recess by means of said lever arm, the positive connection produced by the elastic means being transferred by the abutment of the shoulder against the corresponding said member on the one hand and by the abutment of the spherical head against the said spherical recess.

3. A steering gear, comprising a steering worm, a steering nut encompassing said steering worm, and means adapted to provide engagement between worm and nut such that, upon rotation of said worm, said nut is axially displaced in relation to said worm, a lever arm of which the axis of rotation is crossing the axis of said worm, and elastic means adapted to provide engagement of lever arm and nut including a mushroom-shaped insertion member consisting of a shaft and a partially ball-shaped head, a bore in said lever arm for the reception of the shaft of said insertion member and a partially ball-shaped recess in said steering nut for the reception of the partially ball-shaped head of said insertion member, the axis of said mushroom-shaped insertion member is substantially in parallel relationship with the axis of rotation of said lever arm, and further comprising elastic means on said lever arm adapted to hold said mushroom-shaped insertion member in engagement with said partially ball-shaped recess by means of said lever arm, the positive connection produced by the elastic means being transferred by the abutment of the shoulder against the corresponding said member on the one hand and by the abutment of the spherical head against the said spherical recess.

4. In a steering gear, an axially movable member, a shaft, an inner steering member carried by the shaft, tension spring means adjustable on the shaft and adapted to fix the steering member in position relatively of the axially movable member, said axially movable member having a ball socket with a cylindrical extension axially protruding beyond the center of the socket, and said steering member having a corresponding ball head adapted to fit in said socket and form a positive engagement therewith, said cylindrical extension forming a safety means against disengagement of the ball head and ball socket assembly.

5. A steering gear as claimed in claim 3, wherein the partially ball-shaped head of said insertion member has the form of a spherical segment.

6. A steering gear as claimed in claim 3, wherein the coupling element formed with a partially ball-shaped recess is provided with a cylindrical extension encompassing the ball socket, said extension forming a continuation of said recess and beginning at the plane of the greatest diameter of said recess.

7. A steering gear, comprising a steering worm, a steering nut encompassing said steering worm, and means adapted to provide engagement between worm and nut such that upon rotation of said worm said nut is axially displaced in relation to said worm, a lever arm of which the axis of rotation is crossing the axis of said worm, and elastic means adapted to provide engagement of lever arm and nut including a mushroom-shaped insertion member consisting of a shaft and a partially ball-shaped head, a bore in the one of the elements to be coupled adapted to receive the shaft of the insertion member, and a partially ball-shaped recess in the other of the elements to be coupled for the reception of the partially ball-shaped head of the insertion member, the axis of said mushroom-shaped insertion member is substantially in parallel relationship with the axis of rotation of said lever arm, and further comprising elastic means on said lever arm adapted to hold said mushroom-shaped insertion member in engagement with said partially ball-shaped recess by means of said lever arm.

8. A steering gear, comprising a steering worm, a steering nut encompassing said steering worm, and means adapted to provide engagement between worm and nut such that upon rotation of said worm said nut is axially displaced in relation to said worm, a lever arm of which the axis of rotation is crossing the axis of said worm, and elastic means adapted to provide engagement of lever arm and nut including a mushroom-shaped insertion member consisting of a shaft and a partially ball-shaped head, a bore in said lever arm for the reception of the shaft of said insertion member and a partially ball-shaped recess in said steering nut for the reception of the partially ball-shaped head of said insertion member, the axes of said mushroom-shaped insertion member is substantially in parallel relationship with the axis of rotation of said lever arm, and further comprising elastic means on said lever arm adapted to hold said mushroom-shaped insertion member in engagement with said partially ball-shaped recess by means of said lever arm.

FRIEDRICH K. H. NALLINGER.

References Cited in the file of this patent

UNITED STATES PATENTS

| Number | Name | Date |
|---|---|---|
| 1,237,188 | Ferris | Aug. 14, 1917 |
| 1,893,764 | Douglas | Jan. 10, 1933 |
| 2,129,389 | Twyman | Sept. 6, 1938 |
| 2,267,524 | Hawkins | Dec. 23, 1941 |

FOREIGN PATENTS

| Number | Country | Date |
|---|---|---|
| 357,870 | Italy | Mar. 29, 1938 |